Jan. 19, 1965  G. KIPER ETAL  3,165,990
CAMERA WITH MEANS FOR AUTOMATICALLY INTRODUCING INTO
THE SAME THE FACTOR OF FILM SPEED
Filed March 22, 1961  4 Sheets-Sheet 1
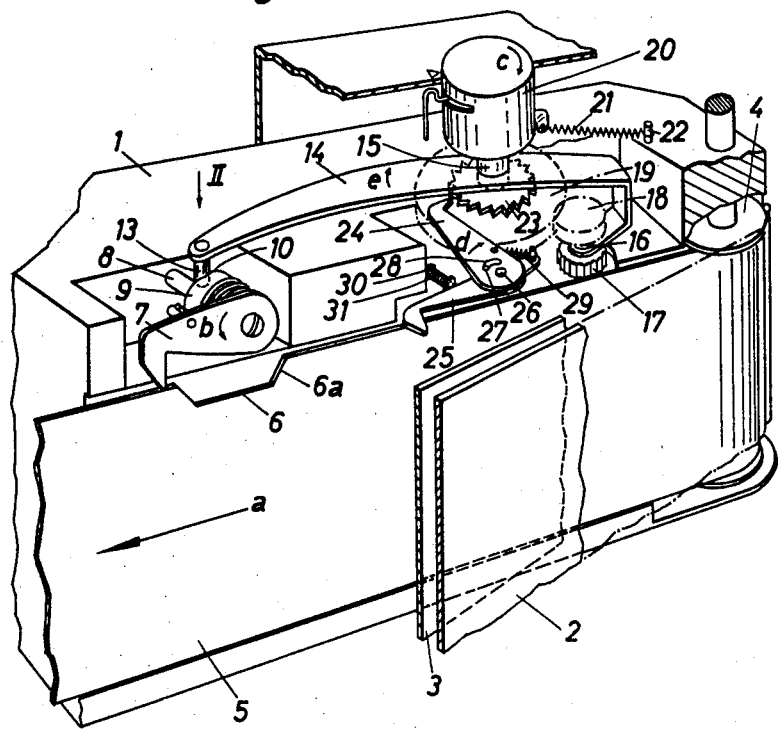
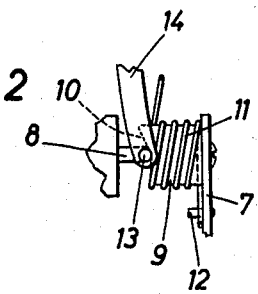
INVENTORS
GERD KIPER
RICHARD DENK
BY

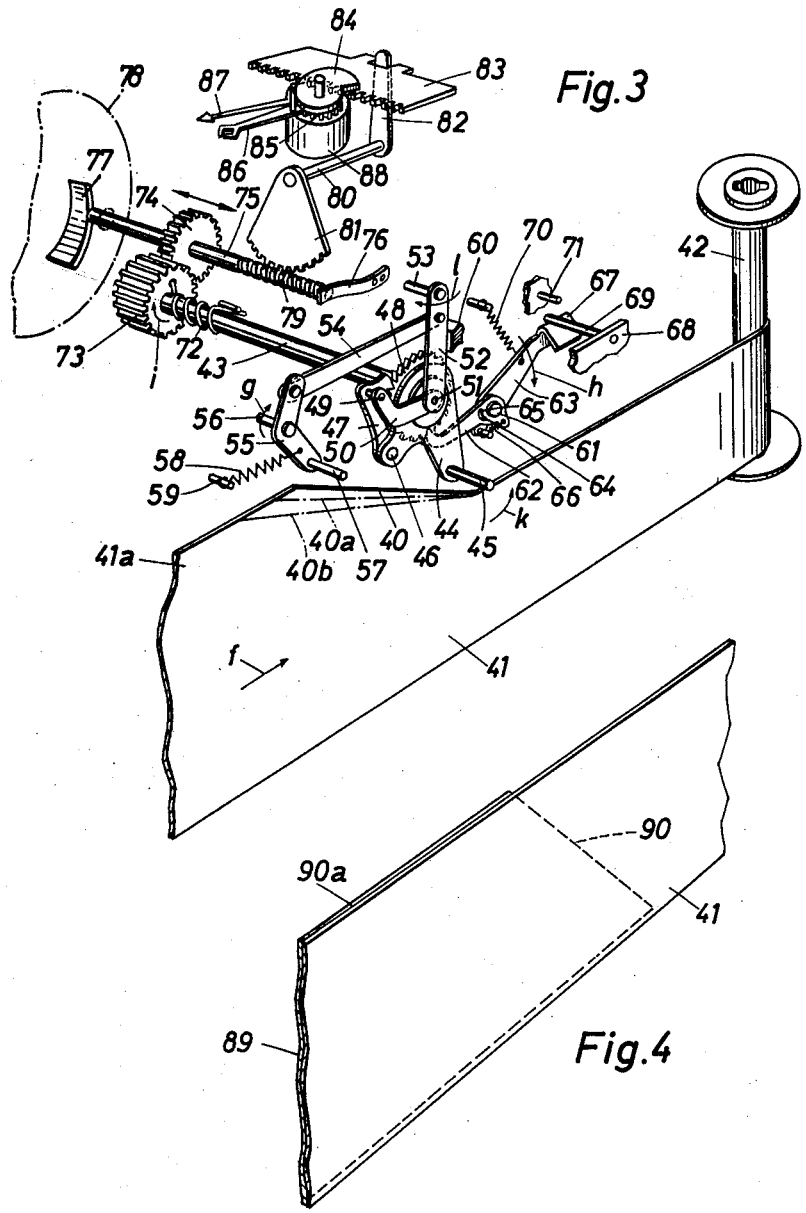

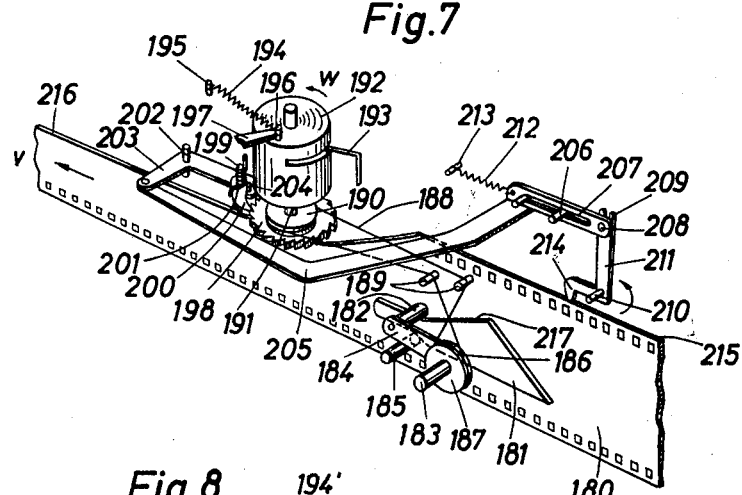
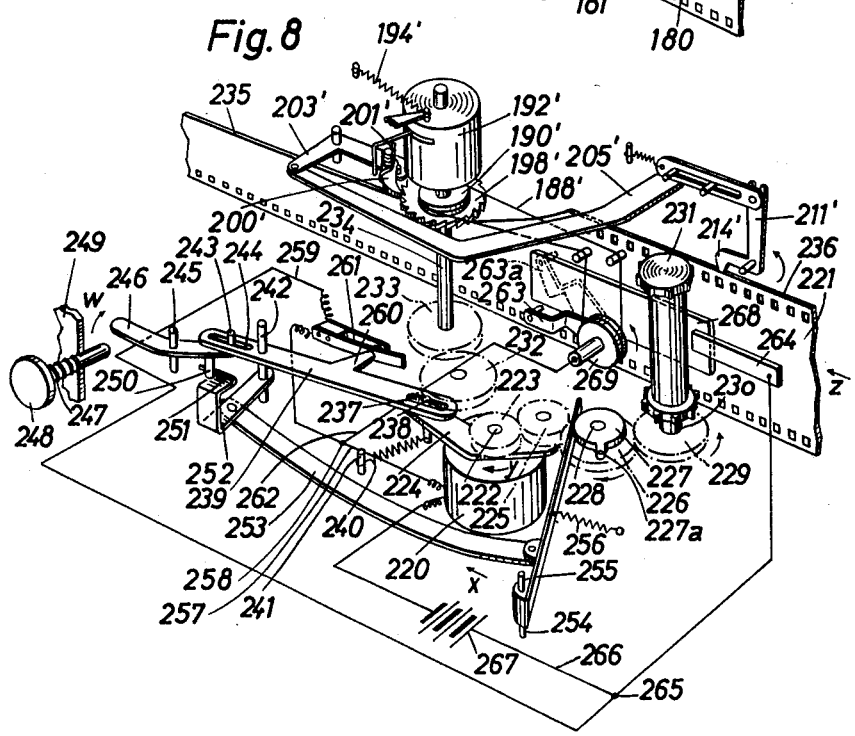

United States Patent Office 3,165,990
Patented Jan. 19, 1965

3,165,990
CAMERA WITH MEANS FOR AUTOMATICALLY INTRODUCING INTO THE SAME THE FACTOR OF FILM SPEED
Gerd Kiper, Unterhaching, near Munich, and Richard Denk, Munich, Germany, assignors to Agfa Aktiengesellschaft, Leverkusen-Bayerwerk, Germany
Filed Mar. 22, 1961, Ser. No. 97,628
Claims priority, application Germany, Apr. 2, 1960, A 34,359
31 Claims. (Cl. 95—10)

The present invention relates to cameras.

More particularly, the present invention relates to devices for automatically introducing into a camera the factor of film speed.

As is well-known conventional cameras carry a dial which may be turned by the operator to indicate the film speed, so that the operator will remember the speed of the film which happens to be in the camera. With automatic or semi-automatic cameras, however, it is necessary for the operator to actually set the factor of film speed into the camera so that a proper exposure will be made. At the present time such setting of the factor of film speed into the camera is carried out manually, so that if the operator forgets to introduce the proper film speed into the camera improper exposures are made.

One of the objects of the present invention is to provide a structure wherein the initial portion of the film strip in the camera carries an indicating means which is indicative of the film speed and which is used to cooperate with additional structure of the invention for automatically introducing into the camera the factor of film speed. The use of the initial portion of the film strip to carry the indicating means which is indicative of film speed is a particular feature of the present invention since the initial portion of the film strip provides an extremely simple and effective area where the indication of the film speed may be included. For example, the cassettes of the film, in which the film is housed, could, also, be provided with a structure which might be indicative of the film speed, but this would involve undesirable costs of manufacture because of the added expense required to manufacture special film cassettes. By incorporating the indicating means into the initial portion of the film strip itself conventional film cassettes may be used and the flexible film strip is very easily and inexpensively treated so as to have any desired number of different indicating means which are respectively indicative of different film speeds.

A further object of the present invention is to use the indicating means carried by the film strip for automatically actuating a structure of the camera which introduces the factor of film speed into the camera. This feature of the invention is to be distinguished from a simple setting of a dial which indicates the film speed. This latter arrangement would only indicate to the operator the speed of the film in the camera but would not actually set the factor of film speed into the camera. With the invention the indicating means which is carried by the film strip is sensed automatically and in accordance with this sensing a structure is automatically actuated for moving a setting means which introduces directly into the camera the factor of film speed, and there need, in accordance with the present invention, be no indication to the user of the speed of the film in the camera.

A further object of the present invention is to provide for a camera a structure which will operate automatically during removal of film from a camera to release the setting means which introduces the factor of film speed for movement back to an initial position so that it will be ready for movement from said initial position to set into the camera the film speed of the next film which is introduced into the camera.

Another object of the present invention is to provide a camera with a structure for setting into the camera the factor of film speed and with this structure being adapted for use either with a semi-automatic camera or with a fully automatic camera. As is well known, many modern cameras include as part of the structure of the camera a light-sensing structure which will automatically sense the lighting conditions. Some of these cameras are then manually operated for setting into the camera the exposure time and exposure aperture in accordance with the lighting conditions sensed by the light meter. For example, the operator sets the exposure time and exposure aperture at any desired combination which will, for example, align a pointer of the light meter with an index. Such a camera is semi-automatic, since it requires manual operations on the part of the operator to introduce the factors of exposure time and/or exposure aperture. Of course, there are also semi-automatic cameras which will automatically introduce either the factor of exposure time or the factor of exposure aperture, and then the operator must manually introduce that one of these two factors which is not automatically introduced. On the other hand, there are also cameras which will use the light meter not only for sensing the light but also for automatically setting the camera at a combination of exposure time and exposure aperture which is required to give a proper exposure under the lighting conditions sensed by the light meter. Such cameras are of course fully automatic, in that they require the operator to do nothing more than trip the shutter in order to make an exposure. The operator is not required to set into the camera either the exposure time or the exposure aperture, and such cameras are of course fully automatic. The structure of the present invention is adapted for use with all of these types of cameras, which is to say with a camera which includes an at least partly automatic structure for determining the exposure of film in the camera.

The film speed may be set into the camera in a variety of ways, and it is another object of the present invention to provide different structures which are respectively adapted to cooperate with these different manners of introducing the film speed. For example, one structure of the invention may be used with that type of camera where the galvanometer housing is turned to an angular position which is indicative of the film speed. Another structure of the invention may be used for that type of camera where an index which cooperates with a light meter pointer is moved for the purpose of introducing the factor of film speed into the camera. A further structure of the invention is adapted to be used with that type of camera where a light shade is moved to a predetermined extent over the photocell of a camera for limiting the amount of light which reaches the photocell so as to introduce the factor of film speed. Still another type of structure according to the present invention may be used for setting a variable resistor in the electrical circuit of the light meter for the purpose of introducing the factor of film speed.

Also, it is an object of the present invention to provide various structures which are adapted to cooperate with various types of indicating means, whether these indicating means, which indicate the film speed, are in the form of film perforations, cutouts at the edge of the film, strips of a particular configuration which are carried by the film, electrically conductive layers carried by the film, etc.

The objects of the present invention also include the provision of structures for introducing the factor of film speed into the camera and capable of being used, respectively, with cameras where the film is advanced manually or, for example, with cameras where an electric motor is provided for advancing the film.

Still another object of the present invention is to provide structures capable of accomplishing all of the above objects and at the same time being simple and reliable in operation and being capable of providing a fully automatic introduction of the factor of film speed into the camera while requiring no special actions on the part of the operator who simply introduces the film into the camera in a purely conventional manner and removes the film from the camera also in a purely conventional manner so that the operator need not be concerned at all with the factor of film speed which is taken care of in a fully automatic manner requiring absolutely no attention on the part of the operator, in accordance with the present invention.

With the above objects in view the present invention includes, in a camera which has an at least partly automatic structure for determining the exposure of film in the camera, a setting means for setting into the camera the factor of film speed. An indicating means indicates the film speed, and this indicating means is carried by an initial portion of the film strip which is in the camera. A sensing means is carried by the camera and cooperates with the indicating means for sensing the latter and receiving therefrom an indication of the speed of the film in the camera, and a moving means is actuated by the sensing means in an automatic manner and cooperates with the setting means for automatically moving the setting means in accordance with the film speed sensed by the sensing means to a position which will introduce in a fully automatic manner the factor of film speed into the camera.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a broken-away fragmentary perspective view, from the rear, of a camera which incorporates one embodiment of a structure according to the present invention, this latter structure being shown in FIG. 1;

FIG. 2 illustrates a detail of structure of FIG. 1, this detail being shown in FIG. 2 as viewed in the direction of the arrow II of FIG. 1;

FIG. 3 is a perspective illustration of a second embodiment of a structure according to the present invention shown as it appears in a camera when looking at the structure from the rear of the camera;

FIG. 4 shows a film strip provided with one possible embodiment of an indicating means according to the present invention;

Figure 5:
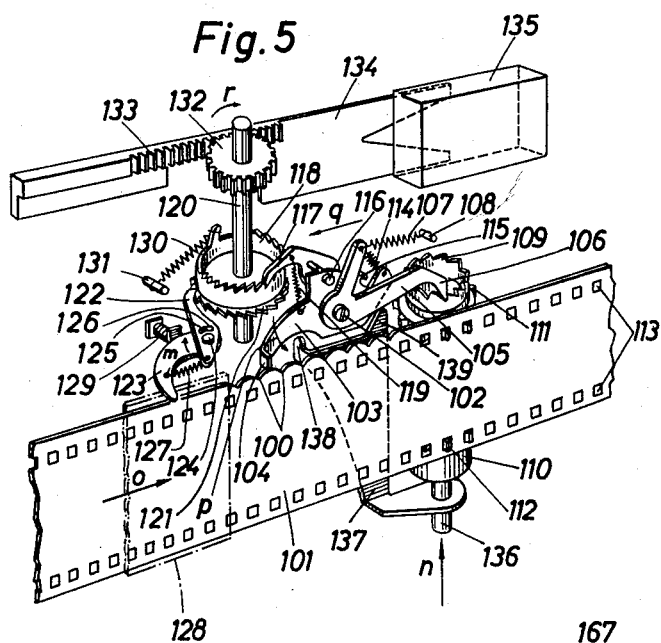
FIG. 5 is a perspective illustration of a third embodiment of a structure according to the present invention also shown as it appears when viewed from the rear of the camera.

FIG. 7 illustrates in a perspective view still another embodiment of a structure according to the present invention, this structure being shown as it appears when viewed from the front of the camera; and FIG. 8 is a partly diagrammatic perspective illustration of still one more embodiment of a structure according to the present invention, the embodiment of FIG. 8 being shown as it appears when viewed from the front of the camera.

Referring to FIG. 1, the camera 1 which is fragmentarily illustrated therein includes a rear wall 2 which is fragmentarily illustrated in FIG. 1 and which is adapted to be turned in a well-known manner between open and closed positions so as to give access to the interior of the camera for the purpose of removing and replacing film therein, and the rear wall 2, which may be hinged to the camera, for example, is shown in FIG. 1 in a position between its fully open and fully closed positions. The rear wall 2 of the camera carries in a conventional manner a pressure plate 3 which is also fragmentarily illustrated in FIG. 1, and this pressure plate 3 serves, as is well-known, to hold the film in the focal plane. The film 5 shown in FIG. 1 is derived from a supply spool 4, and the film moves in the direction indicated by the arrow $a$ in FIG. 1 to the left, as viewed in FIG. 1, from the supply spool 4 to a take-up spool which is not illustrated.

The initial portion of the film strip 5 is shown in FIG. 1, and this initial portion of the film strip carries an indicating means which is indicative of the film speed. In the embodiment which is shown in FIG. 1, this indicating means takes the form of an upper edge portion of the film strip 5 which is formed with the cutout 6. As will be apparent from the description below, with this embodiment of the invention the film speed is indicated by the length of the cutout 6 measured in a direction longitudinally of the film strip, which is to say in the direction of movement thereof.

The indicating means which is formed by the cutout 6 is sensed by a sensing means which is carried by the camera 1, and in the embodiment of FIG. 1 this sensing means takes the form of a rotary sensing lever 7. This sensing lever 7 is turnably carried by a stationary shaft 8 which extends parallel to the optical axis and which serves to support the sensing lever 7 for turning movement about the axis of the shaft 8. The lever 7 is located in the same plane as the film strip 5. The lever 7 is fixed to a sleeve 9 through which the shaft 8 passes, and the end face of the sleeve 9 which is distant from the lever 7 forms a cam 10 which acts as a cam means for a purpose described below. A spring 11 is coiled about the sleeve 9, engages with one end a pin 12 which is fixed to the lever 7, and has its opposite end fixed to a stationary part of the camera, and this spring 11 serves to urge the sensing lever 7 in the direction of the arrow $b$, shown in FIG. 1.

The camera structure of FIG. 1 includes a vertical shaft 15 which extends perpendicularly to the optical axis and which is supported by any suitable, unillustrated bearings for rotary movement, and this shaft 15 serves as a pivotal support for an elongated lever 14 which is formed with a bore through which the shaft 15 passes, as indicated in FIG. 1. This lever 14 is freely turnable about the axis of the shaft 15 and carries at its end which is adjacent to the cam 10 a cam-follower pin 13. The end portion of the lever 14 which is distant from the pin 13 is bent backwardly upon itself, as indicated in FIG. 1, and this end portion of the lever 14 turnably carries a shaft 16 which is fixed at its portion which extends below the end portion of the lever 14 to a friction wheel 17 and at its portion which extends above the end portion of the lever 14 to a pinion 18. Thus, the friction wheel 17 and pinion 18 are fixed coaxially to each other and are constrained to rotate together, and they are supported for rotary movement by the end portion of the lever 14 which is distant from the pin 13. The pinion 18 meshes with a gear 19 which is fixed coaxially to the shaft 15 so that when the gear 19 turns the shaft 15 also turns. The shaft 15 fixedly carries the housing 20 of a galvanometer which forms part of the structure for sensing the lighting conditions and which thus forms part of the structure for determining the exposure of the film in the camera in an at least partly automatic manner. This housing 20 which is carried by the shaft 15 forms in the embodiment of FIG. 1 the setting means for setting into the camera the factor of film speed. A spring means is provided to urge the setting means 20 to a rest position, and this spring means takes the form of a spring 21 connected at one end to a lug which extends from and is fixed to the housing 20 and at its opposite end to a stationary pin 22. Thus, the spring means 21 serves to urge the housing 20 to turn in the direction of the arrow c of FIG. 1.

A holding means is provided for releasably holding the setting means 20 in the position to which it is moved so as to introduce into the camera the factor of film speed, and this holding means includes a ratchet wheel 23 which is fixedly carried by the shaft 15 for rotary movement therewith. The holding means further includes a pawl 24 which cooperates with the ratchet wheel 23, and this pawl 24 is supported for turning movement by a stationary pin 26 which is carried by the camera. A lever 25 is also supported by the pin 26 for free turning movement, and this lever 25 carries a pin 27 which is located in an arcuate slot 28 formed in the pawl 24 and having its center of curvature in the axis of the shaft or pin 26. A spring 29 is connected at its opposite ends to the pawl 24 and the lever 25 and urges the pin 27 to the left end of the slot 28, as viewed in FIG. 1. Thus, the spring 29 urges the pawl 24 to turn in the direction of the arrow d, shown in FIG. 1. A spring 31 is compressed between a stationary member 30 of the camera and a lug which is fixedly carried by the lever 25 so as to urge the left end of the lever 25, as viewed in FIG. 1, toward the rear of the camera. Thus, the spring 31 acts on the lever 25 to urge the latter to turn in a direction opposite to the direction in which is indicated by the arrow d in FIG. 1. The outer free end of the lever 25 is located in the path of turning movement of the pressure plate 3 when the rear wall 2 of the camera is moved to its closed position, and the pressure plate 3 will engage laver 25 to turn the latter in opposition to the spring 31 in the direction of the arrow d when the camera is closed.

When the film 5 is initially placed into the camera, the rear wall 2 is of course in its open position. When the rear wall 2 is then closed the pressure plate 3 engages the lever 25 and turns the latter in the direction of the arrow d. The pawl 24 will follow the movement of the lever 25. Thus, when the lever 25 turns upon closing of the rear of the camera the spring 29 will act on the pawl 24 to maintain the left end of the slot 28 in engagement with the pin 27, and thus the pawl 24 will follow the turning movement of lever 25 and in this way the pawl 24 is placed in operative engagement with the ratchet wheel 23 when the rear wall of the camera is closed. When the rear wall of the camera is moved to its open position the spring 31 acts to turn the lever 25 to the position shown in FIG. 1 and in this way the pawl 24 is moved out of cooperative relation with the ratchet wheel 23.

During transportation of the film 5 in the direction of the arrow a shown in FIG. 1, the indicating means 6 will reach the sensing means 7, and this sensing means will automatically sense the indicating means 6 to receive therefrom an indication of the film speed. Thus, before the cutout 6 reaches the position where the lever 7 enters into the cutout 6 the free end of the lever 7 rides along the upper edge of the film. When the cutout 6 reaches the lever 7, the spring 11 acts automatically to turn the lever 7 into the cutout 6. This turning of the lever 7 will of course also result in turning of the sleeve 9 and the cam 10 will act on the pin 13 to turn the lever 14 in a clockwise direction, as viewed in FIG. 1, so as to move the friction wheel 17 into engagement with the film 5. Thus, the cam 10 cooperates with the pin 13 for turning the lever 14 in the direction of the arrow e shown in FIG. 1 from the inactive position of FIG. 1 where the friction wheel 17 is spaced from the film to an active position where the friction wheel 17 engages the film to be turned in response to the longitudinal movement of the film, and this turning of the friction wheel 17 will continue as long as the free end of the lever 7 is in the cutout 6 and the film 5 continues to advance in the direction of the arrow a.

Thus, as long as the indicating means 6 is sensed by the sensing means 7 and the film 5 advances the friction wheel 17 will be turned as a result of its frictional engagement with the advancing film 5, and thus the pinion 18 will turn and will turn the gear 19 so as to turn the setting means 20 to a position which will introduce into the camera the factor of film speed. At this time the gear 19 turns together with the galvanometer housing 20 in a direction opposite to that indicated by the arrow c, in opposition to the spring 21, and the ratchet wheel 23 of course turns together with the gear 19 with the teeth of the ratchet wheel riding over the tip of the pawl 24 which cooperates with the ratchet 23 to maintain the setting means 20 in the angular position to which it is turned, so that the film speed which is set into the camera remains therein. The slot 28 is long enough to permit the pawl 24 to turn while the teeth of the ratchet ride past the pawl 24, and of course the spring 29 immediately returns the pawl 24 into the space between a pair of the teeth of the ratchet 23 as soon as one of these teeth moves past the tip of the pawl 24.

When the end 6a of the indicating means 6 reaches the sensing means 7, the sensing means is automatically turned by the indicating means in a direction opposite to that indicated by the arrow b, and thus the sensing means 7 returns to its original, rest position. This return of the lever 7 to the position where its free end again engages the top edge of the film 5 returns to sleeve 9 to its original position and causes the cam 10 to act on the pin 13 in a manner permitting the lever 14 to turn in a direction opposite to that indicated by the arrow e, so that the friction wheel 17 moves away from the film 5 while the lever 14 returns to its inactive position, and thus the turning of the setting means 20 ends, the setting means 20 now remaining in the position which sets into the camera the factor of film speed. Any suitable light spring may be provided acting on the lever 14 to urge the latter in a direction opposite to that indicated by the arrow e for maintaining the pin 13 in engagement with the cam 10. The pawl 24 cooperates with the ratchet wheel 23 to retain the setting means 20 in the position to which it has been turned.

It is apparent, therefore, that the extent to which the setting means 20 is turned for setting into the camera the factor of film speed is determined by the length of the cutout 6 longitudinally of the film strip 5, and by providing films of different film speeds with cutouts 6 of different lengths it is possible to automatically introduce into the camera with the embodiment of FIG. 1 the factor of film speed. As is evident from the above description, the sensing means 7 cooperates with the indicating means 6 to act through the cam 10, the pin 13, and the lever 14 on the elements 17–19 to actuate these elements for placing the friction wheel 17 in engagement with the film, so that the moving means which is formed by the elements 17–19 is in this way automatically actuated during sensing of the indicating means 6 by the sensing means 7 to move the setting means 20 to a position which introduces into the camera the factor of film speed.

The embodiment of FIG. 1 is intended primarily for that type of camera where the film moves completely from the supply spool 4 onto the take-up spool which is not illustrated in FIG. 1, so that when the exposed film is removed from the camera it is removed with the take-up spool and then the core of the supply spool is moved into the take-up spool chamber to receive the next strip of exposed film. When the take-up spool with the fully exposed film thereon is removed from the camera, the rear wall 2 is turned to its open position, and the spring 31 turns the lever 25 in a direction opposite to that indicated by the arrow d, and the extent of turning of the lever 25 is such that the pawl 24 is moved out of cooperative relation with the ratchet 23. An unillustrated stop member may be provided to limit the turning of the lever 25 to an angle which is sufficient to guarantee that the pawl 24 will be moved sufficiently away from the ratchet 23 to prevent cooperation between the ratchet 23 and the pawl 24. Of course, at this time the spring 21 can act on the housing 20 to return the latter in the direction of the arrow c of FIG. 1 to its starting position, so that the setting means, for setting the factor of film speed into the camera, is zeroed in this way, and, if desired, any suitable stop member may be provided to determine the initial rest position of the galvanometer housing 20.

The above-described structure shown in FIGS. 1 and 2 may be used either with a semi-automatic camera where the pointer of the galvanometer is placed into alignment with an index by manual introduction into the camera of exposure time and/or exposure aperture, or it may also be used equally well with fully automatic camera where the position of the pointer of the galvanometer is sensed and in accordance with this sensing of the position of the galvanometer pointer the exposure time and exposure aperture are automatically set.

According to the embodiment of the invention which is illustrated in FIG. 3, the initial portion 41 of the film strip is provided with an indicating means in the form of a cutout having an inclined edge 40. This initial portion 41 of the film strip may be part of the film itself or it may be part of a leader made of paper and serving to protect the film itself against exposure while the film is wound on the supply spool which is not illustrated in FIG. 3. The film is advanced from the supply spool in the direction of the arrow f to the take-up spool 42 as shown diagrammatically in FIG. 3.

The structure shown in FIG. 3 includes a shaft 43 which extends parallel to the optical axis and which is supported by suitable unillustrated bearings for rotary movement. The rear end of the shaft 43 turnably carries a lever 44 which is freely turnable with respect to the shaft 43, and this lever 44 forms part of the sensing means of FIG. 3. The lever 44 includes a sensing portion formed by the pin 45 which is fixed to the lever 44 and extends therefrom in a direction parallel to the shaft 43. At a point which is displaced from the shaft 43 the lever 44 carries a pin 46 which serves to pivotally connect to the lever 44 a pawl 47 which is adapted to cooperate with a ratchet 48 which is fixedly carried by the shaft 43 coaxially therewith. Thus, the ratchet 48 serves to turn the shaft 43 in a manner described below. A pin 49 is fixed to the pawl 47 and serves to pivotally connect to this pawl one end of a link 50 whose opposite end is pivotally connected by a pin 51 to the lower end of a lever 52 which is supported for turning movement by a stationary pin 53 which is carried by a stationary part of the camera. An additional link 54 is pivotally connected at one end to the lever 52 and at its opposite end to an additional lever 55 which is pivotally supported by a stationary pin 56 which is carried by a stationary part of the camera, and the lever 55 fixedly carries a second sensing pin 57 which also extends parallel to the optical axis and which is adapted to be engaged by the edge 40 of the indicating means which indicates the film speed. A spring 58 is connected at one end to the lever 55 and at its opposite end to a stationary pin 59 which is carried by a stationary part of the camera, so that the spring 58 urges the lever 55 to turn in the direction of the arrow g shown in FIG. 3. The turning of the lever 55 by the spring 58 is transmitted to the link 54 to urge the latter to the right, as viewed in FIG. 3, and this will urge the lever 52 to turn in a direction opposite to that indicated by the arrow l shown in FIG. 3, and this turning of the lever 55 as well as the lever 52 is limited by a stationary stop member 60 which is carried by the camera and which engages the lever 52 to maintain the parts in the position shown in FIG. 3 when the pin 57 is not engaged by the film strip. In this position of the parts the pawl 47 engages the teeth of the ratchet wheel 48.

A stationary pin 61 which is carried by a stationary part of the camera of FIG. 3 pivotally supports a second pawl 62 which cooperates with the ratchet wheel 48. The pin 61 also serves to pivotally support a lever 63 which is freely turnable about the pin 61, and the lever 63 carries a pin 64 which is located in an arcuate slot 65 formed in the pawl 62 and having its center of curvature in the axis of the pin 61. A spring 66 is connected at its ends respectively to the pawl 62 and the lever 63 so as to urge the lower end of the slot 65, as viewed in FIG. 3, into into engagement with the pin 64. The free end of the lever 63 is bent downwardly and rearwardly so as to have a downwardly and rearwardly inclined surface 67, and the rear wall 68 of the camera, which is turnable between open and closed positions in the same way as the rear wall of the camera of FIG. 1, carries a pin 69 which cooperates with the surface 67 to turn the lever 63 downwardly to the position shown in FIG. 3 when the rear wall 68 is turned to its position closing the camera. The lever 63 is turned at this time in opposition to a spring 70 which is connected at one end to the lever 63 and at its opposite end to a stationary pin which is carried by the camera, and the pin 69 cooperates with the surface 67 to turn the lever 63 in the direction of the arrow h when the camera is closed. When the rear wall 68 of the camera is moved to its position opening the camera, the spring 70 turns the lever 63 upwardly until its free end engages a stationary stop pin 71 which is carried by a stationary part of the camera. When the caemra is open and the lever 63 engages the pin 71, the angular position of the lever 63 is such that the pawl 62 is out of operative engagement with the ratchet wheel 48, while when the camera is closed and the lever 63 has been turned to the position indicated in FIG. 3, the pawl 62 engages the ratchet wheel 48 which may turn in a counterclockwise direction, as viewed in FIG. 3, with the teeth of the ratchet wheel 48 riding over the tip of the pawl 62 which now cooperates with the pawl 48 to prevent return movement of the pawl 48 and to retain in the camera the film speed set into the same, so that the pawl 62 and the ratchet wheel 48 perform a function similar to that performed by the pawl 24 and the ratchet wheel 23 of FIG. 1. Thus, the elements 48 and 62 form, as part of their function, the holding means for holding in the camera the film speed factor set into the same.

A spring 72 is coiled about the shaft 43, engages with one end a stationary pin of the camera, and is fixed at its opposite end to a gear 73 which is fixed coaxially to the shaft 43. The spring 72 tends to turn the shaft 43 in the direction of the arrow i shown in FIG. 3, and this direction is opposite to the direction in which the shaft 43 is turned by cooperation of the pawl 47 with the ratchet wheel 48 during turning of the lever 44 by engagement of the sensing pin 45 with the edge 40. The gear 73 which is fixed coaxially to the shaft 43 meshes with a gear 74 which is fixed coaxially to a shaft 75 which is supported by suitable unillustrated bearings both for rotary and for axial movement. This shaft 75 forms in the embodiment of FIG. 3 the setting means for setting into the camera the factor of film speed. A leaf spring 76 which is fixedly supported in any suitable way at its right end, as viewed in FIG. 3, presses on the rear end of the shaft 75 to urge the latter forwardly so as to maintain the front end of the shaft 75 in engagement with a cam 77 of a well-known totalizing transmission which serves in a semi-automatic camera to axially position the shaft 75 at an axial position which will be indicative of the combination of exposure time and exposure aperture which has been set into the camera. The shutter housing 78 is schematically indicated in FIG. 3. Structures of this type where according to the combination of exposure time and exposure aperture the shaft 75 will be set at a predetermined axial position are well-known and therefore are not described in greater detail. The shaft 75 is provided with a threaded or worm portion 79 which meshes with the teeth of a gear sector 81 which is fixed at the center of curvature of the gear sector 81 to a shaft 80 which is supported by any suitable bearings for rotary movement, and the shaft 80 is fixed to a lever 82 which extends at its upper end into a notch formed in a rack 83 which is supported by unillustrated bearings for movement in a direction parallel to the optical axis. The rack 83 meshes with a pinion 85 which is fixed with a cam 84, and this cam 84 sets in a known way an index member 86 which cooperates with the pointer 87 of the galvanometer 88. With this type of camera the operator sets the exposure time and/or exposure aperture until the combination thereof aligns the pointer 87 with the index 86.

After the film has been placed in the camera with the initial portion of the film 48 joined to the take-up spool 42, the rear wall 68 of the camera is turned to its closed position, so that the pin 69 cooperates with the surface 67 to turn the lever 63 in opposition to the spring 70 in the direction of the arrow $h$, and in this way the pawl 62 is placed in engagement with the ratchet wheel 48. Immediately after the camera has been closed the film is advanced in the direction of the arrow $f$. Thus, the inclined edge 40 which forms the indicating means of the embodiment of FIG. 3 engages the sensing pin 45 of the sensing means 44, 45 and this cooperation of pin 45 with the inclined edge 40 turns the lever 44 in the direction of the arrow $k$. Inasmuch as in the rest position of the lever 55 shown in FIG. 3 the pawl 47 is in operative engagement with the ratchet wheel 48, this turning of the sensing means 44, 45 will result in turning of the shaft 43 together with the ratchet 48 in the direction of the arrow $k$, and of course the shaft 43 turns together with the gear 73 in opposition to the spring 72. The turning gear 73 turns the gear 74 which is fixed to the shaft 75, so that in this way the shaft 75, which forms the setting means of FIG. 3, is turned through an angle which is indicative of the film speed which is indicated by the inclination of the edge 40, and in this way the setting means 75 serves to set into the camera of FIG. 3 the factor of film speed. Of course, the rotary movement of the shaft 75 causes the thread or worm 79 to cooperate with the sector 81 to turn the latter, and this turning will of course result through the shaft 80 and lever 82 in longitudinal movement of the rack 83 so that the pinion 85 turns and the cam 84 also turns so that in this way the position of the element 86 is changed to take into account the factor of film speed. Of course, when the shaft 75 is shifted axially the gear 74 simply moves axially with respect to the gear 73 while remaining in mesh therewith and of course the sector 81 will also turn at this time.

The continued movement of the film strip 41, or a leader which forms part of the film strip, in the direction of the arrow $f$ causes the edge 40 to reach the pin 57 after the sensing means 44, 45 has already turned through a predetermined angle, and the engagement of the edge 40 with the pin 57 will result in turning of the lever 55 in opposition to the spring 58 in a direction opposite to that indicated by the arrow $g$. This turning of the lever 55 will cause the link 54 to be shifted to the left, as viewed in FIG. 3, so that the lever 52 will turn at this time in the direction of the arrow $l$, and this turning will cause the lever 52 to shift the link 50 to the left, as viewed in FIG. 3, so as to turn the pawl 47 out of operative engagement with the ratchet 48, and in this way the turning of the shaft 43 and thus of the shaft 75 for setting the factor of film speed into the camera terminates. As long as the pin 57 rides along the upper edge portion 41a of the film strip 41 the pawl 47 remains out of engagement with the ratchet wheel 48, and the continued turning of the sensing means 44, 45 after the lever 55 has been turned to move the pawl 47 away from the ratchet wheel 48 will not result in any further turning of the shaft 43 as a result of the loose connection between the lever 44 and the shaft 43. As the film strip 41 continues to advance the upper edge 41a thereof reaches in addition to the pin 57 the pin 45, and these pins 45 and 57 simply remain in engagement with the upper edge 41a of the film strip which slides along these pins during exposure of the film strip. During the turning of the shaft 43 by cooperation of the pawl 47 with the ratchet wheel 48, the teeth of the ratchet wheel ride past the tip of the pawl 62 which is free to reciprocate in opposition to the spring 66 to enable the teeth of the ratchet 48 to move past the pawl 62 which immediately snaps behind each tooth to prevent return of the shaft 43 to its initial position by the spring 72. The arcuate notch 65 is of course made long enough to permit the pawl 62 to reciprocate sufficiently to enable the teeth of the pawl 48 to move past the pawl 62. Thus, it will be seen that the spring 72 forms a spring means which urges the setting means 75 to return to its initial position while the pawl 62 and ratchet 48 form a holding means to hold the setting means in the position to which it has been moved for introducing the factor of film speed into the camera in opposition to the spring means 72. Moreover, the sensing means 44, 45 actuates automatically through the pawl 47 and the ratchet wheel 48 the moving means formed by the shaft 43 and the gears 73 and 74 for automatically moving the shaft 75 through an angle which serves to enable the setting means formed by the shaft 75 to set into the camera the factor of the speed of the film which has been placed in the camera. The position of element 86 will of course be determined not only by the speed of the film but also by the combination of the exposure time and exposure aperture. In order to provide different types of film with different indicating means, respectively, it is only necessary to provide different inclinations of the indicating edges of the cutout which forms the indicating means. Thus, FIG. 3 shows in dot-dash lines edges 40a and 40b which respectively indicate two film speeds different from that indicated by the edge 40 and which would be used with films of different film speeds.

After the film of the camera of FIG. 3 has been exposed it is rewound so that it moves in a direction opposite to that indicated by the arrow $f$ and as soon as the edge 40 moves to the left, as viewed in FIG. 3 beyond the pin 57 the spring 58 will return the pin 57 together with the lever 55 to their initial position where the lever 52 engages the stop 60, and as a result the pawl 47 will again be placed in engagement with the ratchet 48. Of course, before the edge 40 of the indicating means has been moved beyond the pin 57 during rewinding of the film the lever 44 has turned freely to the angular position it had just before the pawl 47 was moved out of engagement with the pawl 48 during the initial movement of the film in the direction of the arrow $f$. The lever 47 thus remains in this position during rewinding of the final portion of the film 41, and after the film has been completely rewound the camera is opened to remove the film therefrom. The turning of the rear wall 68 of the camera to open the camera allows the spring 70 to return the lever 63 to the position where its free end engages the stop member 71, and in this way the pawl 62 is moved out of engagement with the ratchet 48 which is now free to turn together with the shaft 43 under the influence of the spring 72 back to its starting position, and of course since the pawl 47 at this time is in engagement with the ratchet 48 the sensing means 44, 45 will also return to its starting position. Any suitable projection may be carried by the shaft 43 to engage a stationary stop member of the camera for determining the starting position of the shaft 43 together with the ratchet 48 and the pawl 47 and sensing means 44, 45. Of course, when the lever 52 engages the stop 60 the pivot 51 has its axis coinciding with that of the shaft 43.

Instead of providing the film strip itself, or the lever which forms part of the film strip, with a cutout having the inclined edge 40, 40a, 40b or the like to provide an indicating means for indicating the film speed, it is posible to fasten, as by gluing or the like, a layer 89 of film or the like which has an edge 90 whose inclination is indicative of the film speed. In this case the pins 45 and 57 will cooperate with this edge 90, and for this purpose these pins 45 and 57 are made shorter so that they will have their free ends in alignment with the edge 90 and will not extend across the strip 41. Of course, where this strip 41 is the leader strip of paper which protects the film against exposure the edge 90 may form the front end of the film itself, and in this event the upper edge 90a of the film 89 will be engaged by the pins 45 and 57 after factor of film speed has been automatically introduced into the camera in the manner described above. Where the strip 41 itself forms the film strip, the element 89 may be in the form of a relatively short piece which has the edge 90 which determines the film speed, and in such a construction the film 41 may press slightly against the ends of the pins 45 and 57 so that when these pins reach the upper edge 90a the film strip 41 will shift through the slight distance required to locate the pins along the upper edge of the film.

According to the embodiment of the invention which is illustrated in FIG. 5 the film strip 101 has an indicating means for indicating the film speed, this indicating means being formed by a series of notches 100 formed along the upper edge of the film strip 101. The number of notches 100 is indicative of the speed of the film. This indicating means 100 is sensed in the embodiment of FIG. 5 by the sensing means which is formed by a lever 103 which has a sensing portion 104 which engages the upper edge of the film strip and thus engages the notches 100 which form the indicating means. The sensing means 103, 104 is supported for turning movement by a stationary pivot pin 102 which is carried by a stationary part of the camera. This pivot pin 102 also serves to pivotally support a pawl 105 which cooperates at its tip 106 with the ratchet teeth 109 of an annular member which is fixedly connected to the film transporting roll 110 coaxially with the latter. A spring 107 is fixed at one end to an arm which projects upwardly from the pawl 105 and at its opposite end to a stationary pin 108 so as to urge the tip 106 of the pawl 105 into engagement with the ratchet teeth 109. The sprockets 111 and 112 of the transporting roll 110 cooperate in a known way with the conventional perforations 113 of the film strip 101 to advance the latter. A spring 114 is fixed at its opposite ends to the sensing lever 103 and to the projection of the pawl 105 so as to urge a lug 115 which is integral with the sensing lever 103 into engagement with an edge of the projection of the pawl 105, as indicated in FIG. 5.

The sensing lever 103 fixedly carries a pivot pin 116 which serves to pivotally connect to the sensing lever 103 a pawl 117 which cooperates with a ratchet wheel 118 which is fixed to the shaft 120 which is supported by unillustrated bearings for rotary movement and which extend perpendicularly to the optical axis. A spring 119 is fixed at one end to the pawl 117 and at its opposite end to the sensing lever 103 so as to maintain the pawl 117 in engagement with the ratchet wheel 118.

A second ratchet wheel 121 is fixed to the shaft 120 coaxially with the latter and with the ratchet wheel 118, and a pawl 122 cooperates with the ratchet wheel 121. The pawl 122 is pivotally supported by a pivot pin 124 which is fixedly carried by a stationary part of the camera, and a lever 123 is also pivotally supported by the pin 124. As in the embodiments described above the lever 123 carries a pin 125 which is located in an arcuate slot 126 formed in the pawl 122 and having its center of curvature in the axis of the pin 124. A spring 127 is connected at its opposite ends to the pawl 122 and the lever 123 in the manner shown in FIG. 5, and the spring 127 urges the pin 125 into engagement with the left end of the slot 126, as viewed in FIG. 5. The rear wall 128 of the camera of FIG. 3 is shown fragmentarily in dot-dash lines in FIG. 3, and when this rear wall 128 has turned to a position which opens the camera spring 129 which abuts at one end against a stationary member and at its opposite end against a lug fixed to the lever 123 turns the latter outwardly to a position which locates the pawl 122 out of operative engagement with the ratchet 121. When the rear wall 128 of the camera has been turned to its position closing the camera, the lever 123 is turned in the direction of the arrow $m$ in opposition to the spring 129 to a position which places the pawl 122 in operative engagement with the ratchet 121, and the length of the slot 126 is such that the teeth of the ratchet 121 can ride past the pawl 122 which at the same time snaps in front of the teeth to prevent return movement of the shaft 120 as will be apparent from the description below. Thus, the pawl 122 and ratchet 121 form a holding means which is releasable and which serves to hold the setting means of FIG. 5 in the position where it sets into the camera the factor of the film speed. A spring 130 is connected at one end to a projection which extends from the ratchet wheel 118 and its opposite end to a stationary pin 131 of the camera, and this spring 130 acts on the ratchet wheel 118 to urge the latter together with the shaft 120 and the ratchet wheel 121 to an initial position, and the pawl 122 cooperates with the ratchet 121 to prevent such return movement until the rear wall 128 of the camera is turned to its open position.

The shaft 120 fixedly carries a pinion 132 which meshes with a rack 133 which is guided by suitable bearings which are not shown for movement to the right and left, as viewed in FIG. 5, and the right end of the rack 133, as viewed in FIG. 5, fixedly carries a light-shading member 134 which extends in front of the photocell 135 which is shown diagrammatically in FIG. 5 and which forms part of the light-sensing structure of the camera of FIG. 5. Instead of a photocell, the shade 134 may extend in front of a light-sensitive resistor whose electrical resistance varies with the variations in intensity of light impinging on the resistor. Thus, the extent to which the shade 134 covers the photocell 135 is determined by the position of the rack 133, and this position will be determined by the extent to which the shaft 120 is turned. Thus, it is the light shade 134 of FIG. 5 which forms the setting means of this embodiment for setting into the camera the factor of film speed.

A manually operable plunger 136 cooperates with the film transporting roll 110 to release the connection thereof with the film advancing structure of the camera when the plunger 136 is moved upwardly by the operator in the direction of the arrow $n$ shown in FIG. 5, and such a structure is conventional for disconnecting the drive through the film transporting roll 110 so that the film 101 may be rewound after exposure. Fixed to the plunger 136 is a member 137 which has at its top end a pair of projections 138 and 139 respectively in alignment with the sensing lever 103 and the pawl 105, so that when the plunger 136 is depressed by the operator preparatory to rewinding the film the pawl 105 will be automatically moved out of engagement with the ratchet 109 and the sensing lever 103 will be turned upwardly to a position where it does not engage the upper edge of the film.

During movement of the film strip 101, whose initial portion is shown in FIG. 5, to the right as indicated by the arrow $o$, the pawl 105 is reciprocated by the ratchet teeth 109. When the notches 100 are sensed by the sensing portion 104 of the sensing lever 103, this lever 103 is turned at its sensing portion 104 into the successive notches 100 each time the tip 106 of the pawl 105 rides over the crest of a tooth of the ratchet 109, and in this way the sensing lever 103 is turned in the direction of the arrow $p$ back and fourth into the successive notches 100 as the film advances. This reciprocation of the sensing lever 103 causes the pawl 117 to be advanced to the left, in the direction of the arrow $q$, and the extent of turning of the pawl 103 is sufficient to move the pawl 117 through a distance which is sufficient to cause the ratchet 118 to be advanced by a distance of one tooth each time the sensing lever 103 is reciprocated. This will of course result in tensioning of the spring 130, but because of the cooperation between the pawl 122 and the ratchet 121 it is not possible for the spring 130 to return the shaft 120 and the ratchet 118 to their starting positions. Thus, with the embodiment of FIG. 5 the automatic sensing by the sensing means 103, 104 of the indicating means 100 causes an automatic actuation of the moving means 117, 118, 120, 132, 133 to cause this moving means to move the setting means 134 to a position which introduces into the camera the factor of film speed, and at this time the pinion 132 turns in the direction of the arrow $r$.

As soon as the straight, unnotched upper edge portion of the film strip 101 reaches the sensing portion 104 of the sensing lever 103, the extent to which the lever 103 can reciprocate during the reciprocation of the pawl 105 is greatly reduced so that the lever 103 can no longer move the pawl 117 through a distance which is sufficient to advance the ratchet 118 through a distance of one tooth, and thus the actuation of the moving means terminates and the setting means 134 remains in the position to which it has been set. Thus, the number of notches 100 determines the position of the setting means 134, and it is only necessary to vary the number of these notches 100 in order to provide different types of film with indicating means indicating their film speeds. Thus, with the embodiment of FIG. 5 the moving means operates in a stepwise manner to move the setting means 134.

After the film has been exposed, it is of course rewound, and in order to effect rewinding of the film it is necessary for the operator to move the plunger 136 upwardly, as has been indicated above, and this movement will automatically result in engagement of the projections 138 and 139 of the element 137 with the lever 103 and the pawl 105, respectively, so as to raise these elements out of their operative positions, and thus the rewinding of the film will have no influence on the structure of the invention.

After the film is rewound the rear wall 128 of the camera is moved to its open position and of course the spring 129 now turns the lever 123 in a direction opposite to that indicated by the arrow $m$, and this will result through the spring 127 and the pin 125 and slot 126 in turning of the pawl 122 out of operative engagement with the ratchet 121 so that the spring 130 can now return the shaft 120 and of course the rack 133 and shade 134 to their starting positions. Any suitable stop member may cooperate with the rack 133, for example, to determine the starting position of the structure of the invention.

With the structure now in its starting position, a new film strip may be introduced into the camera, and in the manner described above the structure will operate automatically to set the factor of the film speed into the camera.

Figure 6:
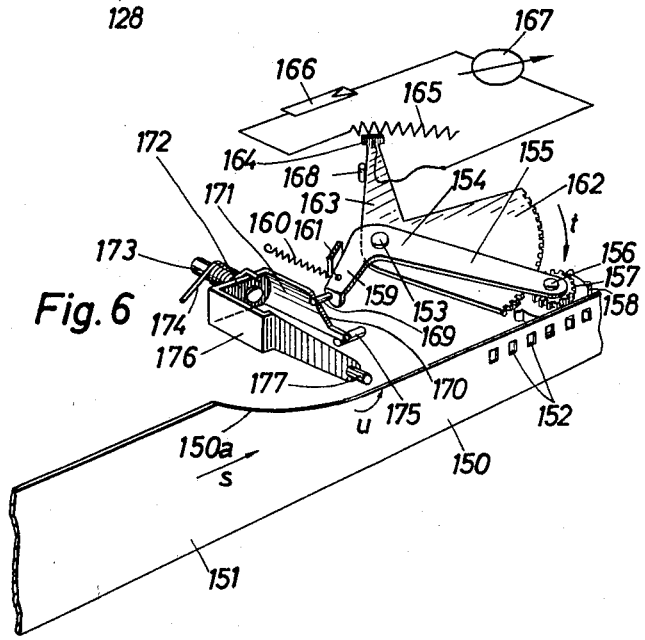
FIG. 6 is a perspective illustration, which is also partly diagrammatic, of a fourth embodiment of a structure according to the present invention, the structure of FIG. 6 also being shown as it appears from the rear of the camera.

In the embodiment of the invention which is illustrated in FIG. 6, the film 151 is formed at its initial portion 150 with a series of perforations 152 which form the indicating means of this embodiment, the film speed being indicated by the number of perforations 152. The embodiment of FIG. 6 includes a stationary pivot pin 153 carried by a stationary part of the camera and serving to pivotally support a lever 154 which has an arm 155 which carries a shaft 156. The shaft 156 is turnably carried by the arm 155 of the lever 154 and fixedly carries a pinion 157 and a sprocket wheel 158, so that these elements 157 and 158 are coaxial with each other and with the shaft 156 and turn as a unit about the axis thereof. The teeth of the sprocket wheel 158 have a distance with respect to each other which corresponds to the distance between the perforations 152. A spring 160 is connected to the other arm 159 of the lever 154, and the end of the spring 160 which is distant from the arm 159 is fixed to a stationary part of the camera. The spring 160 urges the arm 159 against a stationary stop member 161 of the camera.

The pinion 157 meshes with a gear sector 162 which is also supported for turning movement by the pin 153, and the gear sector 162 is fixed to an arm 163 which carries at its free end the sliding contact 164 of a variable resistor which includes the resistor 165. The variable resistor 164, 165 forms the setting means of the embodiment of FIG. 6 for setting into the camera the factor of film speed, and this variable resistor is located in the electrical circuit of the photocell 166 and the galvanometer 167, as indicated diagrammatically in FIG. 6. In order to determine the starting position of the slider 164 of the variable resistor, a stop member 168 is fixedly carried by the camera and engages the arm 163.

The arm 159 of the lever 154 also carries a pin 169 which is fixed to the arm 159 and which engages a camming edge 170 of an elongated member 171 which forms part of a cylinder. This member 171 is fixed to one end of a lever 172 which is turnable about the stationary pin 173 of the camera, and a spring 174 is coiled about the shaft 173, has one end connected to or bearing against a stationary part of the camera, and has its opposite end engaging the lever 172 so as to urge the element 171 downwardly against the stationary stop member 175 which is fixedly carried by the camera. To the end of the lever 172 which is distant from the element 171 is fixed a stepped elongated member 176 which carries at its free end a pin 177, and this pin 177 extends into the plane which is occupied by the film 151. The stepped configuration of the member 176 is such that the pin 177 is located on the same side of the axis of the pin 173 as the element 171, so that when the curved edge 150$a$ of the film 151 engages the pin 177 the lever 172 will be turned in opposition to the spring 174 in the direction of the arrow $u$ shown in FIG. 6.

When the film 151 has been placed in the camera and the camera has been closed, the advance of the film in the direction of the arrow $s$ shown in FIG. 6 is started, and the film slides with respect to the sprocket 158 until a tooth thereof enters into the first of the series of perforations 152. The continued movement of the film 151 in the direction of the arrow $s$ causes the sprocket 158 to turn, so that with the embodiment of FIG. 6 it is the sprocket 158 which forms the sensing means which senses the indicating means formed by the perforations 152. The turning of the sprocket 158 of course results in turning of the pinion 157, and the result is that the gear sector 162 turns at this time in the direction of the arrow $t$, as shown in FIG. 6. As a result the slide contact 164 of the variable resistor which forms the setting means of FIG. 6 moves along the resistor 165 so that the extent to which the pointer of the galvanometer 167 will turn for a given intensity of light is influenced, and thus the factor of the film speed is introduced into the camera in this way.

When the last perforation 152 of the indicating means of FIG. 6 has moved beyond the sensing means formed by the wheel 158, the film may frictionally ride along the wheel 158 for a short distance, and then the curved edge 150$a$ of the film will engage the pin 177 so as to turn the lever 172 and of course the element 171 in the direction of the arrow $u$, and in this way the camming edge 170 of the element 171 acts on the pin 169 to turn the lever 154 in the direction which is opposed to that indicated by the arrow $t$ in FIG. 6, and thus the sprocket or sensing means 158 is moved away from the film and remains out of engagement with the film as long as the pin 177 is located at the upper edge of the film. The turning of the lever 154 in a direction opposite to that indicated by the arrow $t$ simply causes the pinion 157 to ride along the teeth of the gear sector 152. Because of the frictional engagement between tse slider 164 and the resistance 165 the gear sector 162 will remain in the position to which it has been turned by cooperation of the sensing means 158 with the indicating means 152. Thus, with the embodiment of FIG. 6 the sensing means 158 cooperates with the indicating means 152 to actuate the moving means 157, 162 so as to move the setting means 154, 165 to a position which introduces the factor of film speed into the camera, and with this embodiment it is the frictional engagement between the elements 164 and 165 which acts as a holding means to hold the setting means in the position which introduces the factor of film speed into the camera.

When the film 151 is rewound so that moves in a direction opposite to that indicated by the arrow *s* the curved edge portion 150*a* will again reach the pin 177, and as this curved edge portion 150*a* moves to the left, as viewed in FIG. 6, beyond the pin 177 the spring 174 can turn the lever 172 and thus the pin 177 and the element 171 in a direction opposite to that indicated by the arrow *u*, so that the spring 160 can now again turn the lever 154 in the direction of the arrow *t*, and in this way the sprocket 158 is returned into a position engaging the initial portion 150 of the film strip 151. At this time after a slight further movement of the film strip 151 the leftmost perforation 152 will receive a tooth of the sprocket wheel 158 and now the sprocket wheel 158 will turn in a direction opposite to that in which it turned during setting of the film speed into the camera. Because the same number of perforations 152 will cooperate with the sprocket wheel 158 at this time, this wheel will be turned through the same angle as it was originally turned through, and thus the pinion 157 will cooperate with the gear sector 162 to return the latter to its starting position, and in this way the structure has auomatically been returned to its initial position when the film is removed from the camera. Of course, when the spring 175 returns to the lever 172 to its initial position the spring 160 returns the arm 159 into engagement with the stop 161 so as to properly position the sprocket 158 with respect to the film portion 150, and thus the sprocket will be turned back through the same angle that it was originally turned through so as to guarantee that the parts return to their initial position.

In the embodiment of the invention which is illustrated in FIG. 7, the film strip 180, the initial portion of which is shown in FIG. 7, fixedly carries a relatively short strip 181 which forms the indicating means of this embodiment. The indicating member 181, whose configuration is indicative of the film speed of the film 180, may be fixed to the film 180 as by being glued thereto or, for example, by high-frequency fusion. The sensing means of the embodiment of FIG. 7 includes a pin 182 which directly senses the edge portion 217 of the indicating means 181.

The sensing pin 182 is carried by a sensing lever 184 which is supported for rotary movement by a stationary pivot pin 183 which is carried by a stationary part of the camera. The camera of FIG. 7 carries a stationary pin 185 against which the sensing lever 184 is located, as illustrated in FIG. 7, in the rest position of the apparatus, and the elevation of the indicating means 181 on the film 180 is such that as the film 180 advances in the direction of the arrow *v* the upper edge of the indicating member 181 slides beneath the sensing pin 182. The sensing lever 184 of the sensing means of FIG. 7 fixedly carries a pulley 187 which turns the lever 184 about the axis of the pin 183, and this pulley 187 is formed at its periphery with an annular groove 186 which receives the endless cable 188 which may be in the form of a cord of substantially non-stretchable material and of relatively small diameter. For example, the endless cable 188 may be made of nylon. The endless cable 188 is guided over a pair of stationary guide pins 189 and around a second pulley 190. It will be noted that the cable 188 is crossed between the guide pins 189 and the pulley 187, these guide pins 189 being carried by any stationary part of the camera. The pulley 190 may be identical with the pulley 187, and instead of guide pins 189, small guide rollers may be used to guide the cable in the manner shown in FIG. 7 between the pulleys 187 and 190. The pulley 190 is fixed coaxially to a shaft 191 which extends perpendicularly to the optical axis and which is supported by any suitable bearings (not shown) for rotary movement, and the shaft 191 fixedly carries the housing 192 of the galvanometer of the light-sensing structure of the camera of FIG. 7. In the embodiment of FIG. 7 it is the rotary housing 192 of the galvanometer which forms the setting means for setting into the camera the factor of the film speed. The galvanometer includes a pointer 193 which is used in a semi-automatic camera for indicating the lighting conditions and in a fully automatic camera for providing a member to be sensed so as to automatically determine the position of the exposure time setting and exposure aperture setting structure of the camera. A spring 194 is connected at one end to a pin which is fixedly carried by the housing 192 and at its opposite end to a stationary pin 195 which is fixedly carried by a stationary part of the camera, and the spring 194 urges the housing 192 to turn in a direction opposite to that indicated by the arrow *w*, until the pin which is connected to one end of the spring 194 and carried by the housing 192 engages the stationary stop member 197 which is carried by the stationary part of the camera. Thus, it will be seen that the pin 196 which is fixedly carried by the housing 192 and connected to one end of the spring 194 is yieldably maintained by the spring 194 against the stationary stop member 197.

The rotary shaft 191 also fixedly carries a ratchet wheel 198 which is fixed coaxially to the shaft 191 and which cooperates with a pawl 200 which is turnable about the pivot pin 199 which is fixedly carried by a stationary part of the camera. One end of a spring 201 bears against an edge of the pawl 200, is coiled about the pivot pin 199, and rests against a stationary part of the camera, so that the spring 201 urges the pawl 200 into engagement with the ratchet wheel 198.

In order to turn the pawl 200 away from the ratchet wheel 198 out of cooperative relation therewith, a bell crank 203 is supported for pivotal movement about a stationary pivot pin 202 which is carried by a stationary part of the camera, and one arm of this bell crank 203 carries a pin 204 which is adapted to engage the pawl 200 at its edge which is directed toward the ratchet wheel 198 and turn the pawl away from the ratchet wheel. The other arm of the bell crank 203 is pivotally connected to one end of an elongated motion transmitting member 205 which is guided for movement in the same general direction that the film moves by a pair of stationary pins 206 which are carried by a stationary part of the camera and which extend into an elongated slot 207 formed in a part of the member 205. Thus, the parts 206, 207 form a pin-and-slot means guiding the member 205 for horizontal movement to the left and right, as viewed in FIG. 7. The member 205 carries at its right end, as viewed in FIG. 7, a pin 208 which extends into an elongated notch 209 formed in a lever 211 which is turnable about the stationary pivot pin 210 which is carried by a stationary part of the camera, and the lever 211 has a lower free end 214 which is adapted to cooperate with the edge 215, 216 of the film 180 in the manner shown in FIG. 7. One end of a spring 212 is fixed to the member 205 and the opposite end of the spring 212 is fixed to a stationary pin 213 carried by a stationary part of the camera, so that the spring 212 urges the element 205 to the left, as viewed in FIG. 7, and it will be noted that the right end of the slot 207 cooperates with the right pin 206 of FIG. 7 to limit the movement of the element 205 to the left, as viewed in FIG. 7, under the influence of the spring 212. Thus, the spring 212 acts through the element 205 and the pin-and-slot connection 208, 209 on the lever 211 to urge the free end 214 thereof into engagement with the edge 215, 216 of the film 180.

After the film has been placed in the camera of FIG. 7, it is advanced in the direction of the arrow *v*, so that the tip 214 of the lever 211 initially engages the edge portion 216 of the film, at this time the element 205 is displaced to the left, as viewed in FIG. 7 from the position shown in FIG. 7 through a distance sufficient to cause the pin 204 to locate the pawl 200 in opposition to the spring 201 out of operative engagement with the ratchet 198. As the tip 214 of the lever 211 comes into engagement with the edge portion 215 of the film 180, the element 205 is advanced to the right, as viewed in FIG. 7, in a direction opposite to that indicated by the arrow v, and the spring 201 can now move the pawl 200 into engagement with the ratchet 198, so that while the ratchet can turn in the direction of the arrow w, it cannot turn in the reverse direction. During the continued movement of the film in the direction of the arrow v, the sensing portion 182 of the sensing lever 184 engages the edge 217 of the indicating means 181, and because of the inclination of the edge 217 the sensing means 182, 184 turns about the axis of the pin 183, and in this way a clockwise turning of the pulley 187, as viewed in FIG. 7, takes place. Through the endless cable 188, the turning of the pulley 187 is transmitted to the pulley 190 which therefore turns in the direction of the arrow w together with the ratchet 198 and the galvanometer housing 192 which forms the setting means for setting into the camera the factor of film speed. Of course, the extent to which the housing 192 turns in opposition to the spring 194 is determined by the angle through which the sensing means 182, 184 is turned, and this latter angle is determined both by the length and the inclination of the edge 217 of the indicating means 181, so that by providing the indicating means 181 with an edge 217 of a predetermined length and inclination it is possible to indicate the film speed and with the structure of FIG. 7 to automatically introduce the factor of film speed into the camera.

As the film 180 continues to advance in the direction of the arrow v of FIG. 7, the edge 217 moves beyond the sensing portion 182 of the sensing means 182, 184, and the sensing lever 184 simply remains in the position to which it has been turned by the edge 217. The pawl 200 cooperates with the ratchet 198 to prevent a return of the pulley 180 and thus a return of the sensing means 182, 184 to its original position.

After the film has been exposed, it is rewound, and the film 180 will at this time move to the right, as viewed in FIG. 7, in a direction opposite to that indicated by the arrow v. At this time the indicating means 181 will simply move past the sensing means without influencing the latter, and nothing will happen to the structure of the invention until the edge portion 216 of the film 180 becomes aligned with the tip 214 of the lever 211. As soon as this lower edge portion of the film reaches the lever 211, it is free to turn in a counterclockwise direction, as viewed in FIG. 7, and the spring 212 can now shift the element 205 to the left, as viewed in FIG. 7, so that the pin 204 engages the pawl 200 and moves the latter out of operative engagement with the ratchet 198, so that the spring 194 can now turn the housing 192 in a direction opposite to that indicated by the arrow w, back to its initial position where the pin 196 engages the stop member 197, and during such return movement of the setting means 192 the pulley 190 is of course turned and transmits its turning movement through the cable 188 to the pulley 187 which thus acts to return the sensing means 182, 184 to its original position where it engages the stop member 185, and now the structure is ready to cooperate with the next film strip which is introduced into the camera.

In the embodiment which is illustrated in FIG. 8, an electric motor is used for driving the setting means which sets into the camera the factor of film speed, and this same electric motor forms the source of energy for advancing the film in the embodiment of FIG. 8. In other words, the embodiment of FIG. 8 is adapted to be used with that type of camera where an electric motor is used for advancing the film, and in accordance with the invention this same electric motor is used for moving the setting means so as to set into the camera the factor of film speed. Thus, in the camera of FIG. 8, the electric motor 220 is used for transporting the film 221. The shaft 222 of the motor 220 fixedly carries a pinion 223, and in addition a lever 224 is supported for pivotal movement by the shaft 223. The right end of the lever 224, as viewed in FIG. 8, turnably carries a gear 225 which meshes with the pinion 223, and this gear 225 forms an intermediate transmission means which has one position where it transmits the drive of the motor 220 to the film transporting structure and another position where it transmits the drive from the motor 220 to the structure which sets into the camera the factor of film speed. In the position of the parts which is shown in FIG. 8, the gear 225 meshes with a gear 226 which is supported for rotary movement about a stationary pin 228, and the gear 226 fixedly carries, for rotary movement therewith, a cam 227 which has the radially projecting camming portion 227a. The gear 226 meshes with a further gear 229 which is fixed to the shaft 230 of the film-transporting roll 231. Thus, the elements 226, 229 form a transmission means for transmitting a drive to the film-transporting means 231, and in the position of the intermediate transmission 225 shown in FIG. 8, the drive from the motor 220 is transferred through the intermediate transmission means 225 to the transmission means 226, 229 which drives the film-transporting means 231.

In the manner whch is described below, the lever 224 can turn in a counterclockwise direction, as viewed in FIG. 8, to a position where the gear 225, while still remaining in mesh with the gear 223 which is directly driven by the motor 220, meshes with a gear 232 of a second transmission, this gear 232 meshing in turn with a gear 233 which is fixed to a rotary shaft 234 which carries the galvanometer housing 192' corresponding to the housing 192 of FIG. 7 and forming in FIG. 8 also the setting means for setting into the camera the factor of film speed. It will be seen that the embodiment of FIG. 8 includes several elements corresponding to those of FIG. 7, and these corresponding elements are indicated by the same reference characters primed. Thus, the shaft 234 carries the ratchet wheel 198' as well as the pulley 190', and a cable 188' cooperates with the pulley 190'. Furthermore, the pawl 200' cooperates with the ratchet wheel 198' in the same way as the element 200 and 198 of FIG. 7, and the spring 201' urges the pawl 200' toward the ratchet wheel 198'. Furthermore, there is also a bell crank 203', an element 205', and a lever 211', all of which elements correspond to and operate in the same way as elements 203, 205, and 211 of FIG. 7, and it will be seen that the tip 214' of the lever 211' of FIG. 8 cooperates with the edge portions 235, 236 of the film 221 in the same way that the tip 214 of FIG. 7 cooperates with the edge portions 216, 217 of the film 180. With the embodiment of FIG. 8, when the intermediate transmission means 225 meshes with the gear 232 and the motor 220 operates, the drive is transmitted through the intermediate transmission 225 to the transmission means 232, 233 for turning the housing 192' so as to set the factor of film speed into the camera of FIG. 8.

The turning of the lever 224 to place the gear 225 in mesh with either the gear 226 or the gear 232, is derived from a lever 239 which is formed with a slot 237 receiving a pin 238 which is fixed to the lever 224, so that through the pin-and-slot connection 237, 238 the turning of the lever 239 will result in turning of the lever 224. A spring 240 is fixed at one end to the pin 238 and at its opposite end to a stationary pin 241 which is carried by a stationary part of the camera, and the spring 240 urges the lever 224 to turn in that direction which places the gear 225 in mesh with the gear 232. The lever 239 is supported intermediate its ends for turning movement by a stationary pivot pin 242, and it is formed with an additional slot 244 which receives a pin 243 which is fixedly carried by a lever 246 which is supported for turning movement by a stationary pivot pin 245 which is carried by a stationary part of the camera. Thus, the levers 246 and 239 are interconnected with each other through the pin-and-slot connection 243, 244. The levers 246 and 239 form part of a manually operable means for locating the gear 225 in the position shown in FIG. 8, and this manually operable means further includes the element 248 in the form of a manually operable plunger adapted to be moved inwardly by the operator in opposition to the spring 247. The plunger 248 is supported for axial movement through an opening in a wall 249, which may, for example, be the front wall of the camera, and a spring 247 is located between the enlarged end of the plunger 248 and the wall 249 for urging the plunger 248 to the rest position shown in FIG. 8. When the plunger 248 is moved inwardly by the operator in opposition to the spring 247, the inner end of the plunger 247 will engage the lever 246 to turn the latter in the direction of the arrow w', and the result will be that the lever 246 reaches the position indicated in FIG. 8. A lever 252 is turnably carried by the pivot 242 and has an upper springy end portion 251 which is curved in the manner indicated in FIG. 8. As the lever 246 turns upon manual actuation of the plunger 248 in opposition to the spring 247, a pin 250 which is fixed to the lever 246 for turning movement therewith rides over the springy end 251 of the lever 252 and snaps past this end allowing the springy end of the lever 252 to move up behind the pin 250 and prevent return movement of the lever 246 when the operator releases the plunger 248. In this way the pin 250 cooperates with the end 251 of the lever 252 to prevent the spring 240 from returning the parts to their rest position where the gear 225 meshes with the gear 232. An elongated link 253 is pivotally connected at its left end, as viewed in FIG. 8, to the lever 252 and at its right end, as viewed in FIG. 8, to an elongated member 255 which is supported for turning movement by a stationary pivot pin 254 which is carried by a stationary part of the camera. The elongated member 255 extends over and across the gear 226 and is maintained in engagement with the cam 227 by a spring 256 which is fixed at one end to the elongated lever 255 and at its opposite end to a stationary part of the camera. With this arrangement when the camming portion 227a of the cam 227 engages and turns the lever 255 in opposition to the spring 256, the link 253 will turn in the direction of the arrow x of FIG. 8 through a distance sufficient to move the upper end 251 of the lever 252 beyond the pin 250, so that now the parts are released to the spring 240 which can return the parts to their rest position where the gear 225 meshes with the gear 232. The pin 250 of course at this time is located at the other side of the upper end portion 251 of the lever 252, which is to say at the side of end portion 251 opposite from that shown in FIG. 8.

An electrical conductor 257 is connected electrically with the motor 220, and this conductor 257 branches at the point 258. One of the branches 259 includes the switch 261 which is adapted to be closed by the projection 260 of the lever 239 when the parts have the position shown in FIG. 8. The other branch 262 which branches from the conductor 257 at the point 258 is connected electrically with the movable contact arm 263 of an additional switch which includes the stationary contact arm 264, this movable contact arm 263 carrying a contact member which together with the arm 263 forms the sensing means of the embodiment of FIG. 8. The branch conductors 259 and 262 which branch from the conductor 257 at the point 258 are again joined to each other at the point 265, and at this point 265 both of these conductors are connected to a conductor 266 which is connected electrically to the motor 220 and which includes the source of current 267. It will be seen that with this arrangement the switch 261 is connected in parallel with the switch which includes the stationary contact 264 and the movable contact 263. The indicating means of the embodiment of FIG. 8 takes the form of a layer 268 of electrically conductive material which is fastened in any suitable way to the film 221 for movement therewith, and when this layer of electrically conductive material 268 engages both the movable contact 263 and the stationary contact 264, the circuit which includes the branch 262 will be closed and the motor 220 will be operated.

With the embodiment of FIG. 8, after the film 221 has been placed in the camera, the plunger 248 is depressed. This will result in turning of the lever 246 in the direction of the arrow w', and as a result the lever 239 will be turned through the pin-and-slot connection 243, 244, and also the lever 224 will be turned to the position shown in FIG. 8 in opposition to the spring 240 through the pin-and-slot connection 237, 238. The result is that the pinion or gear 225 moves away from the gear 232 and into mesh with the gear 226, and at the end of this movement the projection 260 of the lever 239 closes the switch 261 so that at this time current will flow through the circuit 257, 259, 266 and the motor will be energized and will turn the gear 223 in the direction of the arrow y, shown in FIG. 8. As a result the drive will be transmitted from the motor 220 to the film transporting means 231 through the gears 223, 225, 226, 229 and the film will be transported in the direction of the arrow z. After a single revolution of the gear 226 the camming portion 227a of the cam 227 will engage and turn the lever 255 in opposition to the spring 256 so as to displace the motion transmitting element 253 in the direction of the arrow x, and as a result the pin 250 is released in the manner described above, and the parts returned to their starting position, the switch 261 of course opening so as to deenergize the motor 220. In this way at each depression of the plunger 248 the operator can cause the structure to be actuated so as to advance the film through a distance of one film frame. Thus, atfer each actuation of the plunger 248, the structure will first operate to cause the motor 220 to advance the film, and thereafter in a fully automatic manner the structure will be returned by the spring 240 to its initial position where the gear 225 meshes with the gear 232.

After a few actuations of the plunger 248, the film 221 will have been advanced to the position where the indicating means 268 bridges the contact 263 and 264, and thus closes the circuit 267, 262, 263, 268, 264, 266. With the indicating means 268 in this position, after the cam 227 has completed a revolution so as to release the pin 250, the lever 224 will of course be returned by the spring 240 to its initial position, and the contact or switch 261 will open, but nevertheless the motor 20 will remain energized because of the circuit which is closed by the electrically conductive layer 268 which is carried by the film 221. Thus, when the intermediate transmission means 225 reaches the gear 232 at this time, the motor 220 which continues to operate will transmit its drive through the intermediate transmission means 225 to the transmission means 232, 233 so as to turn the housing 192' and set the factor of film speed into the camera. It will be noted that by the time the indicating means 268 reaches the position bridging the contact arms 263 and 264, the edge portion 236 of the film 221 will have reached the tip 214' of the lever 221' so that the pawl 200' is in its position cooperating with the ratchet 198' to prevent return of the housing 192' by the spring 194' to its original position. The rotary movement derived from the gear 233 is transmitted through the pulley 190' and the cable 188' to the pulley 269 which is fixed coaxially to the rotary contact 263. This rotary contact 263 which forms the sensing means is supported for turning movement by a stationary shaft which is electrically connected with the conductor 262 and forms a part of this conductor for connecting it electrically with the contact 263. The pulley 269 thus turns with the contact 263. As a result, when the pulley 190' is turned it will transmit its rotary movement through the cable 188' to the pulley 269, and the cable 188' may be guided over stationary guide pins or the like in the manner shown in FIG. 8. The sensing means 263 initially has the position 263a indicated in dotted lines in FIG. 8, so that while the pulley 269 is driven it turns the sensing means from the position 263' to the position shown in solid lines in FIG. 8. In the initial position of the sensing means 263 shown in dotted lines in FIG. 8, the layer 268 of electrically conductive material will have its upper edge portion move into engagement with the contact portion of the contact 263, and as soon as the upper edge of the layer 269 engages the rotary contact arm 263 the circuit will be completed through the motor 220, and this circuit remains closed while the movable contact 263 moves downwardly across the layer 268, as viewed in FIG. 8

When the contact portion of the movable contact 263 moves beyond the lower edge of the layer 268, then the circuit through the motor 220 is broken, and the motor stops. Thus, by suitably dimensioning the width of the layer 268, which is to say the distance between its upper and lower edges, as viewed in FIG. 8, it is possible to control the extent to which the housing 192' is turned, and thus it is this width of the layer 268 which forms the dimension thereof which is indicative of the film speed and which controls the extent of turning of the setting means 192' for setting into the camera the factor of film speed. By providing layers 268 of different widths, it is therefore possible to indicate different film speeds for various types of film. As was pointed out above in connection with FIG. 7, which includes substantially the same structure for holding the galvanometer housing in the position to which it has been turned for setting the factor of film speed into the camera, the housing of the galvanometer will remain in the position to which it has been turned during the exposure of the entire film strip, and it is only after the film strip has been rewound when the edge 235 thereof reaches the lever 211', that the structure will be able to operate in the manner described above in connection with FIG. 7 for releasing the pawl 198' so that the spring 194' can now return the housing 192' to its original position. During the return movement of the housing 192' by the spring 194', the pulley 190' will of course act through the cable 188' on the pulley 269 to return the rotary contact 263, which forms the sensing means of the embodiment of FIG. 8 to its initial position shown in dotted lines in FIG. 8.

While the invention has been illustrated and described as embodied in at least partly automatic cameras, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera which has an at least partly automatic structure for determining the exposure of film in the camera, in combination, setting means for setting into the camera the factor of film speed; indicating means carried by an initial portion of a film strip in the camera for indicating the speed of the film in the camera; sensing means carried by the camera and cooperating with said indicating means for sensing the film speed indicated thereby during movement of said initial film strip portion relative to said sensing means; and moving means automatically actuated by said sensing means when the latter senses the film speed, said moving means being driven by longitudinal movement of the film strip for the period of time that said sensing means senses said film speed and said moving means being operatively connected to said setting means for moving the latter to an extent determined by the film speed sensed by said sensing means for automatically setting into the camera the factor of film speed, and said setting means maintaining in the camera, after movement of said indicating means beyond said sensing means, the film speed setting resulting from actuation of said setting means by said moving means.

2. In a camera as recited in claim 1, said indicating means occupying a space different from that occupied by the initial portion of the film strip itself.

3. In a camera as recited in claim 1, said indicating means being in the form of an electrically conductive layer carried by said initial portion of the film strip.

4. In a camera as recited in claim 1, said indicating means being carried by an initial portion of a film strip which is in the camera and which moves longitudinally therein, said indicating means having an indicating portion formed by an edge whose inclination with respect to the longitudinal direction of movement of the film strip is different for different film speeds.

5. In a camera as recited in claim 1, said indicating means including a plurality of indicating portions and the number of said indicating portions being indicative of the film speed.

6. In a camera as recited in claim 1, said indicating means having a dimension crosswise of the film strip which is indicative of the film speed.

7. In a camera as recited in claim 1, said sensing means including a turnable sensing lever carried by the camera and automatically engaging said indicating means during movement of the film strip for sensing the film speed, said sensing lever turning during sensing of said indicating means through an angle which is indicative of the film speed, and said moving means including cable-and-pulley means operatively connected to said sensing lever and said setting means for transmitting turning of said sensing lever to said sensing means to move the latter to an extent which is determined by said indicating means for automatically introducing into the camera the factor of film speed.

8. In a camera as recited in claim 1, said indicating means being carried by the initial portion of a film strip in the camera and being movable longitudinally with the film strip in the camera, said sensing means being in the form of a rotary sensing means carried by the camera for sensing said indicating means and being turned during sensing of said indicating means by movement of the latter with said film strip, the extent of turning of said sensing means being determined by said indicating means so that the extent of turning of said sensing means is indicative of the film speed, and said moving means including motion transmitting means operatively connected to said rotary sensing means and to said setting means for transmitting movement of said sensing means to said setting means to automatically actuate the latter for setting the factor of film speed into the camera.

9. In a camera as recited in claim 1, movable means moving during movement of film in the camera, said indicating means including a plurality of indicating portions distributed longitudinally of the film strip for movement therewith reciprocating means operatively connected to said movable means to be reciprocated thereby and cooperating with said sensing means for reciprocating the latter while the latter senses said indicating portions a number of times corresponding to the number of indicating portions, and said moving means including motion transmitting means cooperating with said sensing means and with said setting means for driving the latter stepwise a number of times equal to the number of reciprocations of said sensing means so that the number of said indicating portion, which is indicative of the film speed, will determine the extent of movement of said setting means for setting into the camera the factor of film speed.

10. In a camera as recited in claim 1, first drive means operatively connected to said setting means for driving the same; second drive means operatively connected to film transporting structure of the camera for driving the latter so as to transport the film; motor means; said moving means including motion transmitting means having one position placing said motor means in operative connection with said first drive means to transmit a drive from said motor means through said first drive means to said setting means and a second position placing said motor means in operative engagement with said second drive means to transmit a drive from the motor means through said second drive means to the film transporting means for transporting film in the camera; said sensing means cooperating automatically with said indicating means for sensing the film speed from said indicating means, said sensing means cooperating with said motor means for maintaining the latter energized while said motion transmitting means interconnects said motor means with said first drive means to an extent which is determined by the film speed indicated by said indicating means so that the setting means will be automatically set to introduce the factor of film speed into the camera.

11. In a camera as recited in claim 10, said indicating means being in the form of a layer of electrically conductive material carried by the film and said motor means being electric and being located in an electrical circuit which includes a stationary contact and a movable contact, said contacts forming part of said sensing means and being bridged by said indicating means for energizing said motor means, and said sensing means including a structure for moving said movable contact so that said motor means remains energized until said movable contact moves out of engagement with said indicating means.

12. In a camera as recited in claim 1, a shade movable to a predetermined extent over a light-sensitive element which forms part of the structure for determining the exposure of film in the camera, said shade thus forming said setting means for setting into the camera the factor of film speed; said moving means cooperating with said shade for moving the latter automatically to a position which is indicative of the film speed, said moving means being driven by longitudinal movement of the film strip for the period of time that said sensing means senses said indicating means.

13. In a camera as recited in claim 1, a variable resistor located in an electrical circuit which forms part of the structure for determining the exposure of film in the camera, said variable resistor forming said setting means for setting into the camera the factor of film speed; said moving means cooperating with said variable resistor for automatically moving the latter during sensing of said indicating means by said sensing means to a position which introduces into the camera the factor of film speed, said moving means being driven by longitudinal movement of the film strip for the period of time that said sensing means senses said indicating means.

14. In a camera as recited in claim 1, transmission means for transmitting to a light-sensing structure of the camera the setting of the exposure time and exposure aperture of the camera, said transmission means including a rotary and axially movable shaft; said moving means cooperating with said shaft for moving the latter according to the film speed sensed by said sensing means, so that said shaft forms said setting means for setting into the camera the factor of film speed, said moving means being driven by longitudinal movement of the film strip for the period of time that said sensing means senses said indicating means.

15. In a camera as recited in claim 1, a rotary shaft forming part of a transmission which transmits a drive to said setting means; a ratchet wheel carried by said shaft; said moving means including a lever freely turnable on said shaft and having a sensing portion forming part of said sensing means which senses said indicating means to be actuated thereby during movement of the initial portion of the film strip, said sensing portion engaging said indicating means to turn said lever through an angle which is indicative of the film speed; a pawl also forming part of said moving means and turnably carried by said lever and cooperating with said ratchet wheel for turning said shaft to transmit a drive through said transmission means to said setting means, a second lever forming part of said moving means and spaced from said first-mentioned lever longitudinally of the film strip; a sensing member forming part of said sensing means and carried by said second lever for engaging said indicating means to be moved thereby for turning said second lever; and coupling means coupling said second lever to said pawl for moving the latter out of engagement with said ratchet wheel when said indicating means reaches said sensing portion of said second lever and turns the latter so that the movement of said setting means is determined by the turning of said first-mentioned lever until the time when the turning of said second lever acts through said coupling means on said pawl to move the latter out of engagement with said ratchet wheel.

16. In a camera as recited in claim 1, said moving means including a rotary shaft; a ratchet wheel fixed to said rotary shaft; a pawl cooperating with said ratchet wheel; a first lever pivotally connected to said pawl for actuating the latter to advance said ratchet wheel during turning of said first lever, said first lever having a sensing portion forming part of said sensing means; a film strip having a plurality of cutouts which form said indicating means for indicating the film speed and said cutouts being movable past said sensing portion of said first lever to be sensed thereby; a film transporting member carrying a second ratchet wheel; a second pawl pivotally connected to said first lever and cooperating with said second ratchet wheel, said film transporting member actuating said second ratchet wheel to reciprocate said second pawl during transportation of film; and a second lever connected to said second pawl for turning movement therewith and connected by a spring to said first lever for reciprocating the latter during an engagement of said sensing portion with said indicating means upon reciprocation of said second pawl so that said first-mentioned pawl will cooperate with said first-mentioned ratchet wheel to advance the latter through steps determined by the teeth of said first-mentioned ratchet wheel through a number of steps determined by the number of said cutouts of said indicating means which indicate the film speed so that said rotary shaft will be turned for moving said setting means to a position indicative of the film speed.

17. In a camera as recited in claim 1, said moving means including a rotary gear sector operatively connected to said setting means for moving the latter during turning of said gear sector to a position which is indicative of the film speed; a pinion meshing with said sector; a sprocket wheel fixed to said pinion for turning the latter, said sprocket wheel forming said sensing means for sensing the film speed; said indicating means being formed by a portion of a film strip which has a plurality of perforations which receive the teeth of said sprocket wheel to turn the latter during movement of the film strip, whereby the number of said perforations is indicative of the film speed and determines the angle through which said sprocket wheel is turned so as to determine the angle through which said sector is turned; a lever turnable about an axis which coincides with the axis of turning of said sector and carrying said pinion and sprocket wheel; cam means cooperating with said lever for turning the latter from an active position where said sprocket wheel cooperates with said perforations to an inactive position where said sprocket wheel is displaced from the film strip with said sprocket wheel out of engagement with the same; and a sensing member forming part of said sensing means and sensing an edge portion of the film strip and cooperating with said cam means for actuating the latter to move said lever to said inactive position thereof after said sprocket wheel has sensed the film speed.

18. In a camera as recited in claim 1, said moving means including a rotary shaft cooperating with said setting means for moving the latter during turning of said shaft; a pulley fixed to said shaft; a rotary sensing lever forming part of said sensing means and carrying a second pulley; a cable extending between said pulleys for transmitting turning movement of said second pulley to said first pulley for moving said setting means during said turning of said sensing lever; said indicating means including an indicating member carried by a film strip and having an edge inclined with respect to the movement of said film strip and cooperating with said sensing lever for turning the latter through an angle which is indicative of the film speed, so that the turning of said sensing lever will be transmitted through said setting means to set the factor of film speed into the camera; a ratchet wheel carried by said rotary shaft for turning movement therewith; spring means operatively connected to said setting means for urging the latter to a predetermined rest position and acting through said setting means on said shaft and ratchet wheel for turning the latter also to a predetermined rest position; a pawl cooperating with said ratchet wheel for preventing turning of the latter to said rest position so as to maintain said setting means in opposition to said spring means in a position which is indicative of the film speed; and means cooperating with an edge of the film strip for maintaining said pawl in engagement with said ratchet wheel only while the film strip is in the camera.

19. In a camera as recited in claim 1, said moving means including first transmission means cooperating with said setting means for moving the latter; film transporting means; second transmission means cooperating with said film transporting means for actuating the latter to transport film in the camera; an electric motor; intermediate transmission means movable between a rest position connecting said electric motor with said first transmission means and an operating position connecting said electric motor with said second transmission means; manually operable means cooperating with said intermediate transmission means for moving the latter from said rest position to said operating position thereof; a first electrical circuit cooperating with said motor for energizing the same and including a first switch means which is closed by actuation of said manually operable means to place said intermediate transmission means in its operating position connecting said motor to said second transmission means; means actuated by said second transmission means for releasing said intermediate transmission means for return movement to said rest position thereof after said film transporting means has moved the film through a predetermined increment; spring means urging said intermediate transmission means to said rest position thereof upon release thereof; and a second electrical circuit in which said motor is located to be energized when said second electrical circuit is closed, said second electrical circuit including a switch means formed by a pair of contacts and a layer of electrical conductive material which bridges said contacts during movement of the film strip, whereby when said second switch means is closed said intermediate transmission in said rest position thereof will transmit the drive from said motor through said first transmission to said setting means for actuating the latter to introduce the factor of film speed in the camera, said layer of electrically conductive material determining the duration of operation of said electric motor while said intermediate transmission means is in said rest position thereof so as to determine the extent of movement of said setting means, whereby said pair of contacts form said sensing means and electrically conductive material forms said indicating means for indicating the film speed.

20. In a camera as recited in claim 19, a common source of current cooperating with both of said electrical circuits for supplying current thereto, said first and second switch means being connected in parallel with each other.

21. In a camera as recited in claim 19, said means for releasing said intermediate transmission means for return to said rest position thereof including a cam which is rotated by said second transmission means and a lever actuated by said cam to act on said manually operable means to release the latter and thus release said intermediate transmission means to said spring means.

22. In a camera which has an at least partly automatic structure for determining the exposure of film in the camera, in combination, setting means for setting into the camera the factor of film speed; indicating means carried by an initial portion of a film strip in the camera for indicating the speed of the film in the camera, said indicating means being formed by at least one cutout which is formed in said initial portion of the film strip; sensing means carried by the camera and cooperating with said indicating means for sensing the film speed indicated thereby; and moving means automatically actuated by said sensing means when the latter senses the film speed, said moving means being driven by longitudinal movement of the film strip for the period of time that said sensing means senses said film speed and said moving means being operatively connected to said setting means for moving the latter to an extent determined by the film speed sensed by said sensing means for automatically setting into the camera the factor of film speed, and said setting means maintaining in the camera, after movement of said indicating means beyond said sensing means, the film speed setting resulting from actuation of said setting means by said moving means.

23. In a camera which has an at least partly automatic structure for determining the exposure of film in the camera, in combination, setting means for setting into the camera the factor of film speed; indicating means for indicating the speed of the film in the camera, said indicating means being carried by the initial portion of a film strip which is in the camera and which is longitudinally movable therein, said indicating means extending longitudinally of the film strip through a distance which is indicative of the film speed; sensing means carried by the camera and automatically sensing said indicating means for receiving therefrom an indication of the speed of the film in the camera; and moving means driven by longitudinal movement of the film strip for the period of time that said sensing means senses the film speed, said moving means being automatically actuated by said sensing means and operatively connected to said setting means for moving said setting means to an extent determined by the film speed sensed by said sensing means so that the factor of film speed will be automatically set into the camera, and said setting means maintaining in the camera, after movement of said indicating means beyond said sensing means, the film speed setting resulting from actuation of said setting means by said moving means.

24. In a camera which has an at least partly automatic structure for determining the exposure of film in the camera, in combination, setting means for setting into the camera the factor of film speed; indicating means for indicating the film speed, said indicating means being carried by an initial portion of a film strip in the camera and being movable longitudinally with the film strip; sensing means carried by the camera and cooperating automatically with said indicating means for movement in a manner controlled by said indicating means so that said sensing means senses the film speed from said indicating means; and moving means operatively connected to said sensing means to be automatically moved thereby during movement of said sensing means when it senses the film speed, said moving means being driven by longitudinal movement of the film strip for the period of time that said sensing means senses said film speed, and said moving means being operatively connected to said setting means for automatically moving the latter during movement of said moving means by said sensing means to an extent which is determined by said indicating means so that said setting means sets automatically into the camera the film speed of the film, and said setting means maintaining in the camera, after movement of said indicating means beyond said sensing means, the film speed setting resulting from actuation of said setting means by said moving means.

25. In a camera which has an at least partly automatic structure for determining the exposure of film in the camera, in combination, setting means for setting into the camera the factor of film speed; indicating means carried by an initial portion of a film strip in the camera for indicating the speed of the film in the camera; sensing means carried by the camera and cooperating with said indicating means for sensing the film speed indicated thereby; and drive means operatively connected to said setting means for driving the same, said drive means being driven by longitudinal movement of the film strip for the period of time that said sensing means senses said film speed, and said drive means being controlled automatically by said sensing means for driving said setting means to an extent determined by the film speed which is indicated by said indicating means, and said setting means maintaining in the camera, after movement of said indicating means beyond said sensing means, the film speed setting resulting from actuation of said setting means by said drive means.

26. In a camera which has an at least partly automatic structure for determining the exposure of film in the camera, in combination, setting means for setting into the camera the factor of film speed; indicating means carried by an initial portion of a film strip in the camera for indicating the speed of the film in the camera; sensing means carried by the camera and cooperating with said indicating means for sensing the film speed indicated thereby; and drive means operatively connected to said setting means for driving the same, said drive means being controlled automatically by said sensing means for driving said setting means to an extent determined by the film speed which is indicated by said indicating means, said drive means being in driving engagement with the film strip to be driven by longitudinal movement of the film strip and said sensing means controlling the length of film which drives said driving means.

27. In a camera which has an at least partly automatic structure for determining the exposure of film in the camera, in combination, setting means for setting into the camera the factor of film speed; indicating means for indicating the film speed, said indicating means being carried by the initial portion of a film strip in the camera; sensing means carried by the camera for sensing said indicating means during movement of said initial film strip portion relative to said sensing means so as to receive therefrom an indication of the film speed; moving means automatically actuated by said sensing means and cooperating with said setting means for automatically moving the latter to a position indicative of the film speed in response to sensing of the film speed by said sensing means, said moving means being driven by longitudinal movement of the film strip for the period of time that said sensing means senses said film speed; spring means cooperating with said setting means for urging the latter to a rest position, said moving means moving said setting means in opposition to said spring means; and releasable holding means cooperating with said setting means for releasably holding the latter, after movement of said indicating means beyond said sensing means, in the position to which it is moved by said moving means in opposition to said spring means.

28. In a camera which has an at least partly automatic structure for determining the exposure of film, in the camera, in combination, setting means for setting into the camera the factor of film speed; indicating means for indicating the film speed, said indicating means being carried by the initial portion of a film strip in the camera; sensing means carried by the camera for sensing said indicating means so as to receive therefrom an indication of the film speed; moving means automatically actuated by said sensing means and cooperating with said setting means for automatically moving the latter to a position indicative of the film speed in response to sensing of the film speed by said sensing means, said moving means being driven by longitudinal movement of the film strip for the period of time that said sensing means senses said film speed; spring means cooperating with said setting means for urging the latter to a rest position, said moving means moving said setting means in opposition to said spring means; releasable holding means cooperating with said setting means for releasably holding the latter, after movement of said indicating means beyond said sensing means, in the position to which it is moved by said moving means in opposition to said spring means, and means operated during removal of a film strip from the camera in connection with the removal of the film strip for releasing said holding means so as to release said setting means to said spring means which returns said setting means to said rest position thereof when the film is removed from the camera.

29. In a camera having an at least partly automatic structure for determining the exposure of film in the camera, in combination, setting means for setting into the camera the factor of film speed; spring means cooperating with said setting means for urging the latter to a rest position; indicating means for indicating the film speed, said indicating means being carried by an initial portion of a film strip in the camera; sensing means carried by the camera for sensing said indicating means to receive therefrom an indication of the film speed; moving means automatically actuated by said sensing means when the latter senses the film speed from said indicating means and cooperating with said setting means for moving the latter in opposition to said spring means to a position which enters the factor of film speed into the camera; a ratchet wheel operatively connected to said setting means for rotary movement during movement of said setting means by said moving means; a pawl cooperating with said ratchet wheel for holding said setting means in the position to which it is moved by said moving means in opposition to said spring means; and means cooperating with said pawl for moving the same into engagement with said ratchet wheel when a strip of film has been placed in the camera and for releasing said pawl for movement out of engagement with said ratchet wheel when a film strip is removed from the camera, so that during removal of the film strip from the camera said setting means is released to said spring means to be moved thereby automatically back to said rest position.

30. In a camera which has an at least partly automatic structure for determining the exposure of film in the camera, in combination, a rotary galvanometer housing forming part of a setting means for setting into the camera the factor of film speed according to the angular position of said galvanometer housing; indicating means for indicating the speed of film in the camera, said indicating means being carried by an initial portion of a film strip in the camera; sensing means carried by the camera for sensing said indicating means to receive therefrom an indication of the speed of the film in the camera; and moving means driven by longitudinal movement of the film strip for the period of time that said sensing means senses said film speed, said moving means being automatically actuated by said sensing means during sensing of said indicating means and cooperating with said setting means for turning said housing thereof to an angular position which introduces into the camera the factor of film speed, and said setting means maintaining in the camera, after movement of said indicating means beyond said sensing means, the film speed setting resulting from actuation of said setting means by said moving means.

31. In a camera which has an at least partly automatic structure for determining the exposure of film in the camera, in combination, a friction drive means; lever means carrying said friction drive means and turnable from an inactive position to an active position where said friction drive means engages a film strip in the camera to be driven by movement of the film strip, and then said lever means being movable from said active position thereof back to said inactive position; cam means cooperating with said lever means for moving the same between said positions thereof; indicating means carried by the film strip for indicating the film speed thereof; sensing means sensing said indicating means to receive therefrom an indication of the film speed, said sensing means automatically actuating said cam means to place said lever means in said active position thereof while said sensing means senses said indicating means; setting means for setting into the camera the factor of film speed; and transmission means cooperating with said friction drive means and said setting means for moving the latter to a position indicative of the film speed while said film acts on said friction drive means.

References Cited by the Examiner
UNITED STATES PATENTS

| | | | |
|---|---|---|---|
| 2,043,901 | 6/36 | Mihalyi | 95—64 X |
| 2,080,055 | 5/37 | Martin | 95—10 X |
| 2,186,611 | 1/40 | Martin | 95—64 |
| 2,186,613 | 1/40 | Mihalyi | 95—64 |
| 2,250,898 | 7/41 | Tonnies | 95—10 |
| 2,493,928 | 1/50 | Rath | 95—64 X |
| 2,674,009 | 4/54 | Williams | 88—19.5 |

NORTON ANSHER, *Primary Examiner*.

L. W. VARNER, Jr., D. B. LOWE, EMIL G. ANDERSON, *Examiners*.